Dec. 24, 1968  A. W. PRYOR  3,417,572
SEPARATION OF HYDROGEN SULFIDE FROM CARBON
DIOXIDE BY DISTILLATION
Filed May 1, 1967
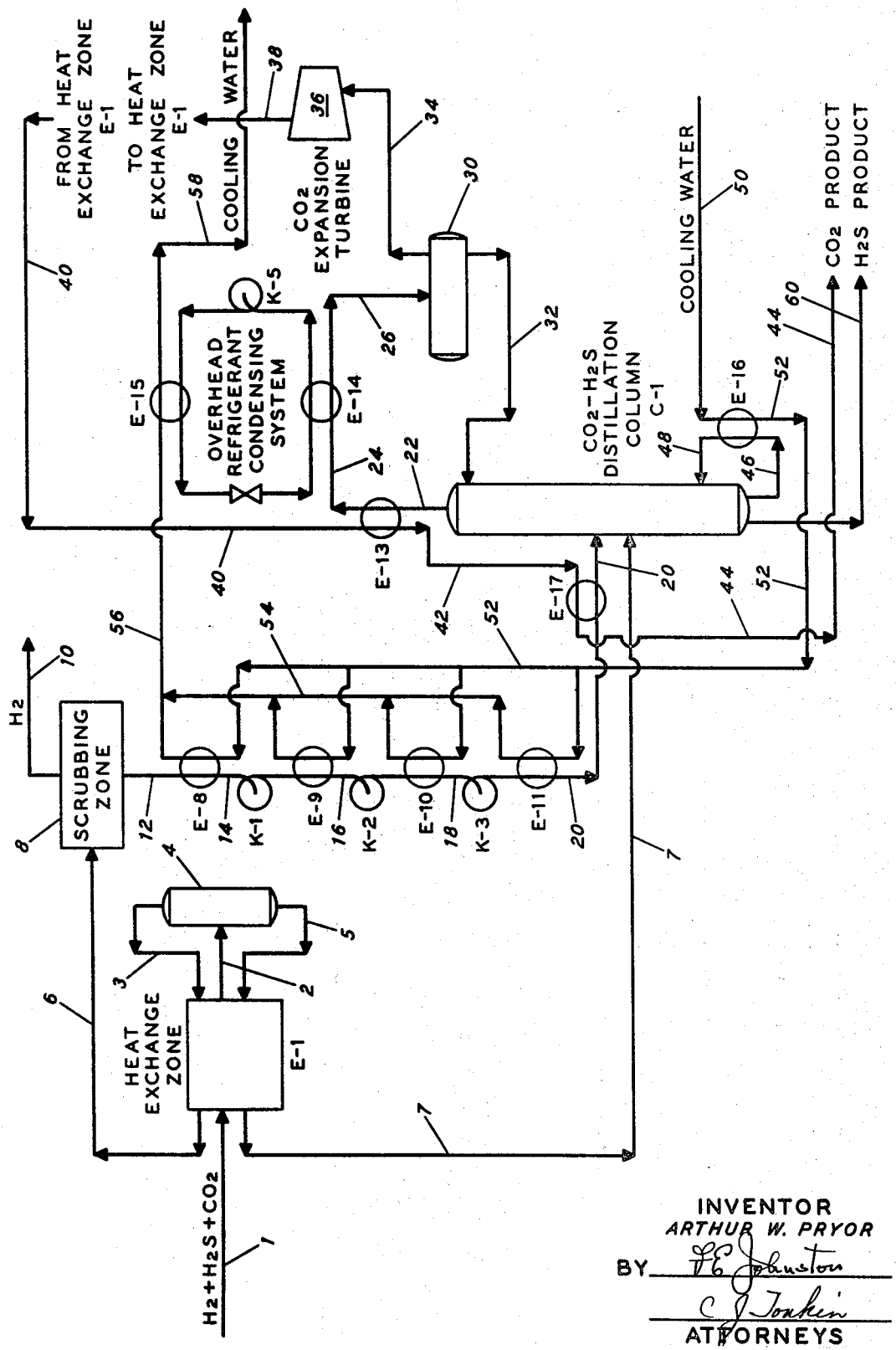
INVENTOR
ARTHUR W. PRYOR
BY
ATTORNEYS United States Patent Office 3,417,572
Patented Dec. 24, 1968

3,417,572
SEPARATION OF HYDROGEN SULFIDE FROM
CARBON DIOXIDE BY DISTILLATION
Arthur W. Pryor, El Cerrito, Calif., assignor to Chevron Research Company, San Francisco, Calif., a corporation of Delaware
Filed May 1, 1967, Ser. No. 635,058
9 Claims. (Cl. 62—17)

ABSTRACT OF THE DISCLOSURE

Hydrogen sulfide and carbon dioxide are condensed and separated from a hydrogen rich gaseous feed mixture. The mixture of hydrogen sulfide and carbon dioxide is passed to a distillation column where carbon dioxide is separated as overhead product and hydrogen sulfide as bottoms product. The distillation column bottoms is reboiled by employing cooling water as reboiler heating medium.

BACKGROUND OF THE INVENTION

Field of the invention

This invention relates to the separation of gases. More particularly, it relates to purification of hydrogen-rich gas by removal of $CO_2$ and $H_2S$, followed by separation of $CO_2$ and $H_2S$.

Prior art

Numerous industrial processes require the removal of large amounts of carbon dioxide and hydrogen sulfide from gas streams. Among these may be mentioned the purification of coke-oven gas or other manufactured gas, such as synthesis gas, or hydrogen produced, in particular, by the oxidation of hydrocarbons followed by the carbon monoxide oxidation procedure known as the water-gas shift reaction.

The known processes for the absorption of the acidic components from gas mixtures generally consists of scrubbing out the acidic gases with alkaline-reacting liquids, such as aqueous solutions of inorganic or organic bases. Among the disadvantages of the known processes are that, in order to effect a complete removal of hydrogen sulfide from the gas to be purified, the absorbent liquid loaded with absorbed impurities must be regenerated with a high expenditure of steam which is unattractive from the standpoint of economy. Further, when using an alkaline absorbent solution for removal of hydrogen sulfide, there is simultaneously absorbed large quantities of carbon dioxide. This is very detrimental for several reasons. For one, the further working-up of the hydrogen sulfide into nonvolatile sulfur compounds, which is necessary to avoid a pollution of atmosphere, is interfered with; and the carbon dioxide also interferes when the hydrogen sulfide-containing gas stripped from the absorbent is to be used in the manufacture of chemical compounds. It is often desirable and preferable, therefore, to separate the carbon dioxide from the hydrogen sulfide before proceeding further. The use of such basic acting solvents is in many cases, therefore, inefficient due to the great expenditure of the thermal energy necessary to effect regeneration and destruction of the equipment due to corrosion attendant on their use.

Processes employing physically acting organic solvents allow, by using sufficiently high pressure absorption towers and maintaining lower absorption temperature—for example, in the region of $-20$ to $-70°$ C.—the obtaining of complete absorption of the hydrogen sulfide with low consumption of energy for the regeneration. The organic solvents, which possess good capacity for absorbing hydrogen sulfide, dissolve simultaneously other gas components, such as carbon dioxide.

Processes for purifying industrial gases are known in which impurities contained in the gas, such as hydrogen sulfide and carbon dioxide, are absorbed simultaneously from the industrial gas mixtures by means of a simple organic polar substance, for example, methanol or acetone at temperatures below $-20°$ C. and under increased pressure. A concentrated mixture of all of the impurities is desorbed during the regeneration of the solvent.

Conditions for carrying out the above process have also been found whereby the organic solvents of the aforesaid type have a certain selectivity for hydrogen sulfide in preference to all of the other gas impurities. Thus, as compared with methanol, acetone has a marked selectivity for hydrogen sulfide. However, during the regeneration, acetone reacts with the hydrogen sulfide to form compounds which can only be separated from the acetone with difficulty and as a result pass finally into the stripped gas as impurities. A comparatively high selectivity was found in the case of the use of dimethyl formamide as an absorbent. In continuous operation, however, the dimethyl formamide undergoes hydrolysis which results in continuous losses and, furthermore, gives rise to the formation of free formic acid which has a corrosive effect on the equipment and necessitates the use of high-grade steel.

In using absorbents to remove $CO_2$ and/or $H_2S$ from hydrogen-rich gas streams, there is a considerable amount of absorbent lost from the system. This is because of numerous factors, such as carry-over of entrained absorbent from the absorption tower due to the large quantity of gas flowing through the absorption tower, pumping leakage losses, and degradation of the absorbent solution (particularly in the use of alkanol amines) requiring filtering and/or bleeding a small quantity of the absorbent out of the system periodically. Therefore, in addition to the initial cost of the absorbent, there is relatively high operating cost associated with the use of the absorbent as considerable quantities of the absorbent must periodically be added to the system.

The present invention, to a great extent, eliminates the foregoing problems incurred with the mentioned selective solvents. At the same time under the present invention, $H_2S$ and $CO_2$ streams are obtained of desired purity; and utility savings may be made in contrast with the large amount of steam that is used to help effect the stripping of $H_2S$ and $CO_2$ out of the respective selective absorbents of the prior art.

Summary of the invention

According to the present invention, a major portion of the $H_2S$ and $CO_2$ contained in raw, hydrogen-rich gas is condensed and separated from the hydrogen-rich gas. The condensed $H_2S$ and $CO_2$ is charged to an $H_2S$-$CO_2$ distillation column. Residual $H_2S$ and $CO_2$, remaining in the hydrogen-rich gas after removing the greatest part of the $H_2S$ and $CO_2$ as a liquid stream, is scrubbed out of the hydrogen-rich gas in a scrubbing plant to result in purified hydrogen. This residual $H_2S$ and $CO_2$ is passed from the scrubbing plant to the $H_2S$-$CO_2$ distillation column.

According to the present invention, the distillation column separates an $H_2S$ bottom product stream from a $CO_2$ overhead product stream by fractional distillation. It has been found that a $CO_2$ overhead product stream of high purity may be obtained while simultaneously producing a bottom product stream of sufficient $H_2S$ concentration to support combustion in a Claus process and utilizing process cooling water as the heating medium for the distillation column reboiler. While the use of distillation is novel as a method of separating $CO_2$ and $H_2S$ streams, reboiling $H_2S$-rich bottoms of the distillation tower using process cooling water as the heating medium is a novel application of process cooling water that results in making the process attractive from the additional aspect of utility savings.

By process cooling water is meant the cooling water generally used in a refinery or chemical plant for cooling various streams, and most commonly is itself cooled in a large process water cooling tower by evaporation of a portion of the water. The evaporation occurs while the water falls downward in the cooling tower after being pumped by large pumps to the top of the cooling tower. Large fans are installed on the top of the process water cooling tower to provide an air draft through the cooling tower.

It has been found that cooling water can be employed in a closed circuit in the invented process. The process cooling water is first used to reboil bottoms in the distillation column used to separate a $CO_2$ overhead product from an $H_2S$ bottoms product. The distillation column is operated at a pressure such that the temperature in the bottom of the distillation column corresponding to the desired $H_2S$ bottoms product may be reboiled by the cooling water, and at the same time the cooling water is cooled substantially below its inlet temperature to the distillation column reboiler so that it may be next used to cool the inlet feed stream to the distillation column coming from the hydrogen gas scrubbing zone. After the cooling water is used to cool feed to the distillation column, it is further used to cool the overhead refrigerant discharging from the overhead refrigerant compressor. The temperature of the cooling water leaving the overhead compressor discharge cooler is at essentially the same temperature as the desired inlet temperature for the distillation column reboiler so that the circuit of the cooling water may be completed by passing it directly from the overhead refrigerant cooler to the distillation column reboiler. Thus, the cost of a cooling tower with the associated equipment may be eliminated or at least substantially reduced.

As mentioned under "Background of the Invention," prior processes used to purify hydrogen-rich gas and to separate $H_2S$ and $CO_2$ use steam in the absorbent strippers. In applicant's process, the bulk of the $CO_2$ and $H_2S$ is not passed to absorption but is, instead, first condensed and then separated into $CO_2$ and $H_2S$ product streams by fractional distillation. A small part of the $H_2S$ and $CO_2$ contained in the hydrogen-rich gas fed to the process is not condensed and separated from the hydrogen-rich gas as a liquid but, instead, remains in the hydrogen-rich gas in gaseous form. This small part of residual $H_2S$ and $CO_2$ is removed from the hydrogen-rich gas by any of the common scrubbing processes.

Using a distillation column to effect the separation of $CO_2$ and $H_2S$ product streams results in the flexibility to obtain products of the desired purity by altering variables, such as the tray at which the feed is introduced to the distillation column, and the amount of reflux to the distillation column. Because in the invented process the majority of the $CO_2$ and $H_2S$ is removed from hydrogen-rich gas by condensation and separated into respective product streams by distillation rather than selective absorption, considerable savings are made in absorbent costs. Also, because cooling water is used in a novel manner, utility savings are made compared to the large amount of steam that would be used to effect separation of $CO_2$ and $H_2S$ using selective absorbents.

*Brief description of the drawing*

The drawing is a schematic flow diagram of the invented process. Major sequential steps shown in the drawing include: a heat exchange zone to condense the majority of the $H_2S$ and $CO_2$ in the hydrogen-rich gas so that $H_2S$ and $CO_2$ may be removed from the hydrogen-rich gas and fed to the distillation column; a scrubbing zone to remove residual $H_2S$ and $CO_2$ remaining in the hydrogen-rich gas after condensation of the major part of the $H_2S$ and $CO_2$; a distillation column which produces an overhead $CO_2$ product of high purity and a bottoms $H_2S$ product that is suitable for feed to a Claus process. Cooling water is used to reboil the bottom of the distillation column and cool the feed to the distillation column coming from the hydrogen gas scrubbing zone, as well as to cool the overhead refrigerant discharging from the overhead refrigerant compressor.

*Detailed description and description of a preferred embodiment*

Referring now to the drawing, stream 1 is a hydrogen-rich gas, typically from partial oxidation of a sulfur-containing oil. In partial oxidation of hydrocarbons containing sulfur compounds, hydrogen, carbon monoxide, $CO_2$ and $H_2S$ are formed. Before being fed to the invented process, the CO is preferably converted to hydrogen and $CO_2$ by the water-gas shift reaction. Thus, the main constituents in the feed to the invented process are hydrogen, $H_2S$ and $CO_2$. Prior to passing the hydrogen-rich gas to heat exchange zone E–1, it is preferable to remove water from the gas using a regenerative drier. Any water present would cause icing in the cold section of heat exchange zone E–1. In heat exchange zone E–1, the feed gases are cooled to about −50° F. to condense a major portion of the $CO_2$ and $H_2S$ in the feed gases. The various heat exchangers in heat exchange zone E–1 may be optimized in various arrangements. A desirable sequence for the heat exchangers in heat exchange zone E–1 is: heat exchange of feed in line 1 against condensed $H_2S$ and $CO_2$ leaving counter-currently in line 7; then heat exchange of feed against $H_2$-rich stream containing residual $H_2S$ and $CO_2$ gases entering in line 3 and leaving countercurrently in line 6; then heat exchange of feed against $H_2S$ product from distillation column in line 60; then heat exchange against a refrigerant (such as propane, used in a small compression and expansion loop); then heat exchange of feed against $CO_2$ product from the distillation column in line 38.

The last-mentioned step of cooling the feed with the expanded $CO_2$ must be controlled carefully to avoid formation of solid $CO_2$. The $CO_2$ cools as it is expanded through expansion turbine 36. Due to the unique Mollier or phase diagram for $CO_2$ (Perry's Chemical Engineers' Handbook, 4th edition, Sec. 3, p. 158), solid $CO_2$ abruptly forms in depressurizing $CO_2$ below 75 p.s.i.a. and about −70° F. To avoid formation of solid $CO_2$, sufficient back pressure must be maintained on the $CO_2$ expanding and cooling across $CO_2$ expansion turbine 36. In the invented process scheme this may be done by a pressure control instrument regulating vapor flow from a vapor-liquid separation drum receiving the mixed phase discharge in line 38 from expansion turbine 36. The raw, hydrogen rich gas feed is desirably passed countercurrent to the vapor from the vapor-liquid separation drum and then through a heat exchange tube bundle submerged in the liquid $CO_2$ contained in the vapor-liquid separation drum.

The cooled gases and liquid are withdrawn from heat exchange zone E–1 in line 2 and passed into separator 4. Liquid $CO_2$ and $H_2S$ is withdrawn in line 5 from separator 4 and passed back through the heat exchange zone E–1 so that it is partly vaporized before being fed to distillation column C–1. Temperature of the $H_2S$ and $CO_2$ leaving heat exchange zone E–1 in line 7 is preferably about 50° F. The hydrogen gas withdrawn from separator 4 in line 6 containing residual gaseous $H_2S$ and $CO_2$ is passed to scrubbing zone 8 and is removed from the $H_2S$ and $CO_2$ to result in purified hydrogen leaving the scrubbing zone in line 10. The purified hydrogen may be used, for example, in a hydrocracking or in a hydro-treating process. The $H_2S$ and $CO_2$ is removed from the hydrogen-rich gas in the scrubbing zone by any of the commonly used absorbents or methods. $H_2S$ and $CO_2$ is withdrawn from the scrubbing zone in line 12 and cooled in the respective exchangers E–8, E–9, E–10 and E–11, using cooling water from line 52. Between each of the respective exchangers, the $H_2S$ and $CO_2$ stream is compressed by the respective compressors K-1, K-2 and K-3. Final cooling of the $H_2S$ and $CO_2$ from the scrubbing zone is effected by E-17 by passing the $H_2S$ and $CO_2$ countercurrent to overhead $CO_2$ product. The $H_2S$ and $CO_2$, at a temperature of about 50° F., is then introduced into distillation column C-1 at the appropriate distillation tray. Those skilled in the art of distillation will appreciate that it is advantageous to pass the stream richer in $H_2S$ into the column at a lower point than the stream richer in $CO_2$.

The more volatile $CO_2$ passes upward in distillation column C-1, and the less volatile $H_2S$ passes downward. As the $CO_2$ passes upward, its purity is increased constantly so that the overhead $CO_2$ stream withdrawn from C-1 in line 22 has only a small $H_2S$ content. The overhead $CO_2$ stream is cooled in exchanger E-13 by $CO_2$ overhead product which has been cooled by expansion in a turbine. Overhead $CO_2$ is withdrawn from E-13 in line 24 and further condensed by overhead refrigerant in E-14. Mostly liquid $CO_2$ is withdrawn from E-14 in line 26 and passed to overhead accumulator 30. Reflux of high $CO_2$ purity is withdrawn from the overhead accumulator 30 in line 32 and passed to the upper part of distillation column C-1. The amount of reflux passed to distillation column C-1 in line 32 may be regulated, thus regulating the temperatures in the upper part of distillation column C-1 which, in turn, will regulate the purity of the overhead $CO_2$, as well as having an effect on the lower part of the column.

Distillation of the $CO_2$ and $H_2S$ feed streams, consisting of condensed $CO_2$ and $H_2S$ and the residual $CO_2$ and $H_2S$ scrubbed out of the hydrogen-rich gas, is done at 400 to 900 p.s.i.a., preferably about 600 p.s.i.a. It has been found that a pressure of 600 p.s.i.a. is advantageous for carrying out the invented process. At 600 p.s.i.a. operating pressure, process cooling water may be used in the closed circuit described above or, alternatively, in a circuit including a process water cooling tower. Little duty (i.e., heat removal) will be required for the process water cooling tower; because, in the invented process, the cooling water is substantially cooled while reboiling the distillation column bottoms. Thus, no or very little additional cooling tower expense is required for the addition of the invented process to a given oil refinery or chemical complex.

Pressures higher than 600 p.s.i.a. may be used in the distillation of $CO_2$ and $H_2S$, but the higher pressures result in a decrease in the relative volatility of $CO_2$ to $H_2S$ with the result that more distillation stages are required in the distillation column to effect the desired separation. Also, higher pressures result in an increase in distillation column bottoms temperature when obtaining the desired $H_2S$ product of at least 10 percent $H_2S$ concentration, thus preventing the advantageous use of cooling water as the heating medium for the reboiler. Lower pressures result in a considerable increase in the overhead refrigerant compressor horsepower requirements.

Desirable temperature ranges for the distillation are 30 to 90° F. for the lower part of the distillation column and 20 to 85° F. for the upper part of the distillation column. Those skilled in the art will appreciate that the product purities desired affect the economic optimum temperatures. At 590 p.s.i.a. operating pressure for the distillation column, the overhead temperature is about 42° F. for an essentially $H_2S$-free $CO_2$ overhead; and the bottoms temperature is about 45° F. for $H_2S$ bottoms of slightly more than 10 volume percent $H_2S$.

$CO_2$ vapor is withdrawn from overhead accumulator 30 in line 34 and passed to $CO_2$ expansion turbine 36 to recover work energy from the high pressure $CO_2$. The work that is available from the expansion turbine 36 resulting from the expansion of the $CO_2$ may be used to furnish the horsepower required by compressors K-1, K-2 and K-3. The expanded $CO_2$ is withdrawn from the expansion turbine in line 38 and passed to heat exchange zone E-1 to cool the inlet raw, hydrogen-rich gas stream. The expanded $CO_2$ is withdrawn from heat exchange zone E-1 in line 40 and passed through exchanger E-13 countercurrent to overhead $CO_2$ withdrawn from distillation column C-1 in line 22. $CO_2$ product is then passed in line 42 through exchanger E-17 to cool $H_2S$ and $CO_2$ feed to the distillation column coming from the hydrogen gas scrubbing zone. $CO_2$ product is withdrawn from the process in line 44. The product $CO_2$ obtained from the distillation column is of sufficiently low $H_2S$ content (e.g., less than 10 p.p.m. $H_2S$ if distilled in accordance with Example 1) that it may be discharged to the atmosphere via a tall stack.

$H_2S$ contained in the feed to the distillation column is withdrawn from the bottom of the distillation column in line 60. The $H_2S$ product stream contains at least 10 percent $H_2S$ by volume so that it is suitable as feed to a Claus process for the manufacture of sulfur.

Fundamentally, the Claus process (sometimes also referred to as the Claus-Chance process) involves burning one-third of the hydrogen sulfide to form sulfur dioxide. The sulfur dioxide is reacted with the unburned $H_2S$ in the presence of surface active catalyst, such as bauxite, at about 600° F. to form sulfur and water vapor. The sulfur is condensed to the liquid form and pumped to storage or to tank cars for shipment or to storage space where it is allowed to solidify and thereafter handled as a solid. The two stages of the hydrogen sulfide conversion may be represented as:

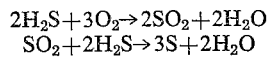

The combustion of $H_2S$ may be carried out by either passing all of the $H_2S$ into the combustion chamber with the calculated amount of air to oxidize one-third of the $H_2S$ or by splitting the $H_2S$ stream before it enters the combustion chamber. In some cases, the hydrogen sulfide is accompanied by inert gases resulting in design difficulties. Inert gases may be present to such an extent that the gas stream will not support combustion. In some cases, this problem can be handled by expensive absorption and desorption techniques. In this way, the $H_2S$ concentration is increased sufficiently to support combustion. The ratio of $H_2S$ to inert gas (such as $CO_2$) should be at least 1 to 9 to support combustion in a Claus process.

Because of the large quantity of $CO_2$ that is typically present in the hydrogen gas stream 1 relative to the amount of $H_2S$, if the $CO_2$ and $H_2S$ were separated unselectively from the hydrogen-rich gas, the concentration of the $H_2S$ would not be high enough to support combustion in a Claus process. In the present process, this problem is eliminated by increasing the $H_2S$ concentration in the $CO_2$ by means of the distillation column C-1.

Material from the bottom of distillation column C-1 is also withdrawn in line 46 and passed through reboiler E-16 wherein it is heated and at least partially vaporized. This material then leaves reboiler E-16 in line 48 and is introduced into the distillation column, thus furnishing reboiling heat in accordance with standard distillation techniques. The material passed in lines 46 and 48 through the reboiler E-16 is heated by cooling water introduced in line 50 and withdrawn from E-16 at line 52. The cooling water is cooled about 25° F. in E-16 with the result that it is of sufficient low temperature, preferably about 50° F., so that it may be used advantageously to cool $H_2S$ and $CO_2$ gases passing through exchangers E-8, E-9, E-10 and E-11. The cooling water is passed through these exchangers by being drawn off inlet header line 52 and then withdrawn from the exchangers and passed into outlet manifold line 54. The large quantity of water passed through these exchangers is generally heated only a few degrees Fahrenheit through the exchangers and, therefore, may be used as a cooling medium for E–15, the overhead refrigerant cooler. The cooling water is passed in line 56 through E–15 to cool the overhead refrigerant which has been compressed by compressor K–5. Propane may be used as the overhead refrigerant. Cooling water leaves E–15 at about 75° F. in line 58. The cooling water in line 58 may be routed directly to line 50 to thus form a closed circuit for the cooling water. Alternatively, the cooling water may be passed in line 58 to heat exchange zone E–1 to cool propane refrigerant discharging from the small refrigerant compressor used in the small compression and expansion loop previously mentioned as being desirably contained in heat exchange zone E–1. After use in heat exchange zone E–1, the cooling water may need to be cooled slightly—for example, by a process water cooling tower—in order to keep the system in heat balance.

In the invented process, the closed circuit will be more attractive from an economical standpoint if there is no existing process water cooling tower available to handle a small increment in cooling duty. If there is an existing process water cooling tower that can handle a slightly higher cooling duty, then the cooling water system of the invented process may be connected to the cooling tower for flexibility. In the latter case, utility savings will still, of course, be realized; because, in the invented process scheme, the heat that need be removed by a process water cooling tower is small—which, in turn, means little water need be evaporated in the cooling tower to effect the required heat removal.

EXAMPLE 1

Typical process conditions were calculated for a feed gas having the following composition:

$H_2$ ---------------------- pounds per hour __ 21,600
$CO_2$ ---------------------------- do ____ 227,000
$H_2S$ ---------------------------- do ____ 1,380

With reference to the drawing, inlet conditions in line 1 were taken as 1,800 p.s.i.g. and 100° F. The $H_2$-rich feed gas is dried and passed to E–1 for chilling. The feed gas is cooled to 50° F. by heat exchange with stream 5, to +5° F. by heat exchange with stream 3, to −3° F. by heat exchange with expanded stream 60, to −13° F. by supplemental refrigerator, to −24° F. by heat exchange with expanded $CO_2$ vapor, and to −50° F. by heat exchange with and vaporization of liquid $CO_2$ in stream 38.

Condensed $CO_2$ and $H_2S$ liquid in separator 4 is partially expanded, passed through E–1 and partially vaporized at 48° F. The 193,000 lb./hr. of mixed phase is fed to the distillation tower C–1 at an appropriate tray.

$H_2$-rich gas from separator 4 contains about 35,400 lb./hr. $CO_2$ and $H_2S$. This residual acid gas is removed in a conventional scrubbing plant (such as an MEA Unit), dried and recompressed from 10 p.s.i.g. at 100° F. in several stages to enter C–1. Pre-, inter- and after-stage coolers, which used chilled cooling water from C–1 reboiler, are used to cool the $CO_2$–$H_2S$ mixture to 48° F. before entering C–1 on an appropriate tray.

The operating pressure of C–1 was set at 588 p.s.i.a. to give temperatures of 42° F. overhead and 45° F. in the bottom of C–1. This bottoms temperature permits the use of cooling water to supply 69.5$\overline{M}$ BH of heat to the reboiler. For 75° F. cooling water chilled to 50° F. in the reboiler, this duty requires 5,560 g.p.m. of water. Effluent water flow from the reboiler is split to act as cooling water in E–8 (0.28$\overline{M}$ BH), E–9 (1.66$\overline{M}$ BH), E–10 (2.16$\overline{M}$ BH) and E–11 (0.64$\overline{M}$ BH). The 50° F. water is heated to 52° F. in these parallel cooler services based on the gas flow rates and compressor efficiencies used for the calculation.

$H_2S$ product (11 vol. percent $H_2S$) from the bottom of C–1 is dried (in event of reboiler leak) and adiabatically flashed to 125 p.s.i.a. and −50° F. This stream is heated to 0° F. in heat exchange with feed in E–1. The cold (0° F.) product stream has some refrigeration potential which was not readily usable in the heat exchange system described. This stream may require "tempering" to ambient temperature, for example by heat exchange with air, before entering the Claus plant for production of sulfur.

$CO_2$ overhead from C–1 is partially condensed in E–13 by heat exchange with −18° F. $CO_2$ product from E–1. The remainder of the $CO_2$ reflux is condensed in E–14 and separated from the vapor product in accumulator 30. Reflux is returned to the top of C–1. One hundred trays are used in C–1 to effect the separation of $CO_2$ product and $H_2S$ product in this example. At a reflux of 1,340 g.p.m. $CO_2$, the distillation column C–1 is 9′ 6″ inside diameter.

An overhead $C_3$ refrigeration system operating with the evaporator at 15° F. and condenser at 100° F. was selected for calculation. Chilled cooling water at 52° F. is used to condense refrigerant in E–15. Outlet water temperature is 77° F., close to the 75° F. inlet to the reboiler. The 77° F. water then may be used for 2.44$\overline{M}$ BH of $C_3$ refrigerant condenser duty at 90° F. in E–1 zone and would give a final water temperature of about 78° F. Thus, the cooling water would only have to be cooled 3° F. in a process water cooling tower before being returned to reboiler E–16.

Overhead product vapor is dried (in event of possible water leaks in reboiler E–16) and passed to an expansion engine (turbine) wherein the $CO_2$ is expanded to −60° F. at 95 p.s.i.a., assuming 80 percent engine efficiency. The 1,870 BHP of power developed may be used to drive the multistage compressors (1,376 BHP total at 80 percent efficiency) and an electric generator (350 kw. at 95 percent efficiency). The mixed phase from the turbine goes to E–1 zone for heat exchange to vaporize all liquid before depressuring. The depressured vapor at −62° F. is heat exchanged with feed to −18° F., heat exchanged with C–1 overhead +30° F. and heat exchanged with a C–1 feed stream to 32° F.

It is to be understood that the forms of the invention shown and described herein are to be taken only as preferred embodiments. Various changes may be made within the basic process, such as the sequence of the many exchangers or the manner of compressing the $H_2S$ and $CO_2$ removed from the $H_2$-rich gas by scrubbing. Feed to the process was described in general as that obtained from a partial oxidation of hydrocarbons followed by shift conversion of the CO in the partial oxidation effluent to $CO_2$ and $H_2$, but any stream containing $H_2S$ and $CO_2$ plus one or more lower boiling point constituents can be advantageously processed in the invented process.

I claim:

1. Process for separating $H_2S$ from $CO_2$ which comprises:
   (a) feeding a mixture of $H_2S$ and $CO_2$ to a distillation column;
   (b) distilling the $H_2S$ and $CO_2$ in said distillation column to obtain an essentially $H_2S$-free $CO_2$ overhead product and an $H_2S$ bottoms product containing at least 10 volume percent $H_2S$; and
   (c) reboiling $H_2S$-rich bottoms of said distillation tower using process cooling water as a heating medium to heat and thereby reboil said $H_2S$-rich bottoms.

2. Process of claim 1 wherein said distillation column has an overhead refrigeration condensing system and process cooling water, after reboiling $H_2S$-rich bottoms in said distillation column, is used to remove heat from said overhead refrigeration condensing system.

3. Process of claim 2 wherein said $H_2S$ bottoms product is fed to a Claus process for production of sulfur.

4. Process of claim 3 wherein said distillation column is operated at:

(a) an overhead accumulator pressure of between 400–900 p.s.i.a. and temperature between 20–85° F.; and (b) a bottom temperature higher than the overhead accumulator temperature and between 30–90° F.

5. Process for purifying raw, $H_2$-rich gas and separating $H_2S$ and $CO_2$ contained in the $H_2$-rich gas which comprises:

(a) cooling said raw, $H_2$-rich gas mixture below the condensation temperature of a major portion of the $H_2S$ and $CO_2$ contained in the $H_2$-rich gas mixture;

(b) separating as a liquid a major portion of the $H_2S$ and $CO_2$ contained in said raw, $H_2$-rich gas;

(c) separating residual $H_2S$ and $CO_2$ from the $H_2$-rich gas after Step (b) to obtain purified $H_2$;

(d) feeding the $H_2S$ and $CO_2$ obtained by Steps (b) and (c) to a distillation column; and (e) distilling the $H_2S$ and $CO_2$ in said distillation column to obtain an essentially $H_2S$-free $CO_2$ overhead product and an $H_2S$ bottoms product containing at least 10 volume percent $H_2S$.

6. Process of claim 5 wherein $H_2S$-rich bottoms of said distillation column are reboiled using process cooling water as a heating medium to heat and thereby reboil said $H_2S$-rich bottoms.

7. Process of claim 6 wherein said $H_2S$ bottoms product is fed to a Claus process for production of sulfur.

8. Process of claim 6 wherein said distillation column has an overhead refrigeration condensing system and process cooling water, after reboiling $H_2S$-rich bottoms in said distillation column, is used to remove heat from said overhead refrigeration condensing system.

9. Process of claim 8 wherein said distillation column is operated at a pressure of about 588 p.s.i.a., a bottoms temperature of about 45° F. and an overhead temperature of about 42° F.

References Cited

UNITED STATES PATENTS

| 3,290,890 | 12/1966 | Bray et al. | 62—26 XR |
| 3,292,382 | 12/1966 | Bray et al. | 62—40 XR |
| 3,320,753 | 5/1967 | Bray et al. | 62—40 XR |

FOREIGN PATENTS 713,414   8/1954   Great Britain.

NORMAN YUDKOFF, *Primary Examiner.*

V. W. PRETKA, *Assistant Examiner.*

U.S. Cl. X.R.

53—37; 62—294, 394, 457; 220—15; 113—120; 29—512